United States Patent
Yeo et al.

(10) Patent No.: US 11,882,211 B2
(45) Date of Patent: Jan. 23, 2024

(54) MULTIPLE EVALUATION THRESHOLD FUNCTION SECRET SHARING

(71) Applicant: Seagate Technology LLC, Fremont, CA (US)

(72) Inventors: Foo Yee Yeo, Shugart (SG); Nolan Miranda, Winston-Salem, NC (US); Vipin Singh Sehrawat, Shugart (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 101 days.

(21) Appl. No.: 17/489,592

(22) Filed: Sep. 29, 2021

(65) Prior Publication Data
US 2023/0095443 A1 Mar. 30, 2023

(51) Int. Cl.
H04L 9/08 (2006.01)
H04L 9/06 (2006.01)
H04L 9/00 (2022.01)

(52) U.S. Cl.
CPC .............. H04L 9/085 (2013.01); H04L 9/008 (2013.01); H04L 9/0662 (2013.01); H04L 9/0825 (2013.01)

(58) Field of Classification Search
CPC ....... H04L 9/085; H04L 9/008; H04L 9/0662; H04L 9/0825
See application file for complete search history.

(56) References Cited

U.S. PATENT DOCUMENTS

| 10,917,235 | B2 | 2/2021 | Gama et al. | |
| 11,308,226 | B1* | 4/2022 | Riazi | G06F 3/0655 |
| 2017/0353855 | A1* | 12/2017 | Joy | H04W 12/02 |
| 2023/0050481 | A1* | 2/2023 | Nagaraja | H04L 9/3231 |

FOREIGN PATENT DOCUMENTS

| CN | 112149160 A | 12/2020 |
| EP | 3439234 A1 | 2/2019 |

OTHER PUBLICATIONS

Beimel, Amos, et al., "Computing functions of a shared secret", In SIAM Journal on Discrete Mathematics, 2000, 324-345.
Boneh, Dan, et al., "Key Homomorphic PRFs and Their Applications", Crypto 2013, Part I, LNCS 8042, 2013, 410-428.
(Continued)

*Primary Examiner* — Ashokkumar B Patel
*Assistant Examiner* — William B Jones
(74) *Attorney, Agent, or Firm* — HOLZER PATEL DRENNAN (57) ABSTRACT

A function secret sharing (FSS) scheme that facilitates multiple evaluations of a secret function. The FSS scheme includes a function share based on a secret function and at least one key of a key-homomorphic pseudo random function (PRF). At least one key and a function share are provided to each party in the FSS scheme. In turn, each party may generate an output share comprising a function share output evaluated at a function input and a masking component generated based on the at least one key in relation to the key-homomorphic PRF. In turn, the output shares of each participating party may be combined to evaluate the secret function. The FSS scheme facilitates multiple evaluations of the secret function without leaking information regarding the secret function.

20 Claims, 5 Drawing Sheets

(56) References Cited

OTHER PUBLICATIONS

Boyle, Elette, et al., "Function Secret Sharing", International Association for Cryptologic Research: Eurocrypt 2015, Part II, LNCS 9057, 2015, 337-367.
Boyle, Elette, et al., "Function Secret Sharing: Improvements and Extensions", CCS '16: Proceedings of the 2016 ACM SIGSAC Conference on Computer Communications Security, Oct. 2016, 1292-1303.
Herzberg, Amir, et al., "Proactive Secret Sharing or: How to cope with perpetual leakage", Advances in Cryptology, Crypto '95, 1995, 339-352.

\* cited by examiner

MULTIPLE EVALUATION THRESHOLD FUNCTION SECRET SHARING

BACKGROUND

Secret sharing approaches have been proposed that make it possible for multiple parties to compute a public function that depends on private data without the need the parties to reveal their private data. For example, cryptographic schemes such as multi-party computation have been proposed to facilitate such computation of a public function with private data while preserving the private data as private. That is, in these contexts the function is public, and the data is private. However, in other contexts data might be public while the function or algorithm that is being applied to the data could be private. The function could be private for a number of reasons such as being a trade secret or the like.

In turn, Function Secret Sharing (FSS) has been proposed to facilitate evaluation of a private or secret function. In FSS, a function $f$ is shared among a plurality of parties, which can be denoted by $P_1, P_2, \ldots, P_n$. Each party $P_i$ receives a function share $f_i$ of the secret function to be evaluated. Given a public input x, each party $P_i$ can compute a result $f_i(x)$. The results of participating parties can then be combined to give $f(x)$, the evaluation of the secret-shared function $f$ at the input x. All this is achieved without the parties having any knowledge of what the function $f$ actually is, as each party only receives a function share $f_i$ and only combines the resulting evaluation of each party's function share at the input x.

SUMMARY

The present disclosure relates to a function secret sharing (FSS) scheme. The FSS scheme may be established by choosing a key-homomorphic pseudo random function (PRF) F and generating at least one key for the key-homomorphic PRF for each of a plurality of parties in the FSS scheme. The method disclosed herein may include generating a function share of the secret function for each of the plurality of parties at least in part based on the at least one key for each respective one of the plurality of parties. In turn, a function share is distributed to corresponding ones of the plurality of parties. An output share of each of a plurality of participating parties is combinable to generate an output of the secret function. The output share of each party is generated based on the party's function share and the at least one key. In turn, the secret function is evaluatable multiple times without providing any information regarding the secret function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

While prior FSS approaches may facilitate evaluation of a private or secret function amongst a plurality of participating parties, these approaches may be limited to a single evaluation capability. For example, prior FSS schemes may only allow the parties to privately evaluate the secret function a single time without leaking information about the secret function. The limit on the scheme of a single evaluation means that the practicality and applicability of these schemes is severely limited. For instance, having a limitation of a single evaluation may require provision of many different copies of the function shares to allow for multiple independent evaluations, which may greatly increase the share size.

For instance, let $\mathcal{P} = \{P_i\}_{i=1}^n$ be a set of n>1 semi-honest parties that wish to audit the consistency of a public blockchain with respect to various parameters. While prior FSS schemes may allow the parties in $\mathcal{P}$ to audit the blockchain, prior FSS schemes allow only a single evaluation. Accordingly, the present disclosure provides an FSS scheme that provides the capability for multiple evaluations of a secret function without leaking information regarding the function. As will be shown herein, this scheme has been recognized to provide a significant benefit over prior approaches. In turn, FSS may be extended to new applications and/or make existing applications more robust by facilitating multiple instances of evaluation of the secret function without compromising security of the scheme.

The present disclosure relates to examples of FSS schemes that may provide multiple evaluations of a secret function without leaking information regarding the secret function to the participating parties. The FSS schemes described herein work in both synchronous and asynchronous settings. In other words, the FSS scheme of the present disclosure improves upon the existing FSS schemes by allowing an unlimited number of evaluations.

Specifically, the example FSS schemes of the present disclosure generally includes the use of a key-homomorphic pseudo random function (PRF) to mask an output share of each participating party. The output share based on the key-homomorphic PRF prevents any information leakage from evaluating the secret function multiple times, while the key-homomorphism property of the key-homomorphic PRF allows the parties to evaluate the function privately even though the output shares are masked using the key-homomorphic PRF. A key-homomorphic PRF is a function that appears random to any adversaries who do not possess a piece of secret information, known as a key. A key-homomorphic PRF F satisfy the additional property that:

$$F(k,y) + F(k',y) = F(k+k',y)$$

where k, k' are keys of the PRF and y is an input value for the PRF. In this regard, knowing the evaluation of the key-homomorphic PRF with different keys k and k' allows one to compute the evaluation of the PRF with a key k+k'.

For purposes of illustration, a simplified example of an FSS scheme is initially described. Given a secret function $f$, a dealer creates function shares $f_1, \ldots, f_n$ and distributes a function share $f_i$ to each participating party $P_i$ in the FSS scheme. To evaluate the secret function $f$ at x, each participating party $P_i$ computes $f_i(x)$ and shares this result with the other participating parties. Using the function outputs of each party (e.g., $f_1(x), f_2(x), \ldots, f_n(x)$), the parties then run a reconstruction function using the function outputs of each party ($f_1(x), f_2(x), \ldots, f_n(x)$) as inputs to reconstruct $f(x)$, such as, for example by computing $f_1(x)+f_2(x)+ \cdots +f_n(x)$. However, as noted above, the evaluation of the secret function $f$ at x ($f(x)$) can only be performed once. Any additional evaluations would leak information regarding the secret-shared function $f$.

Figure 1:
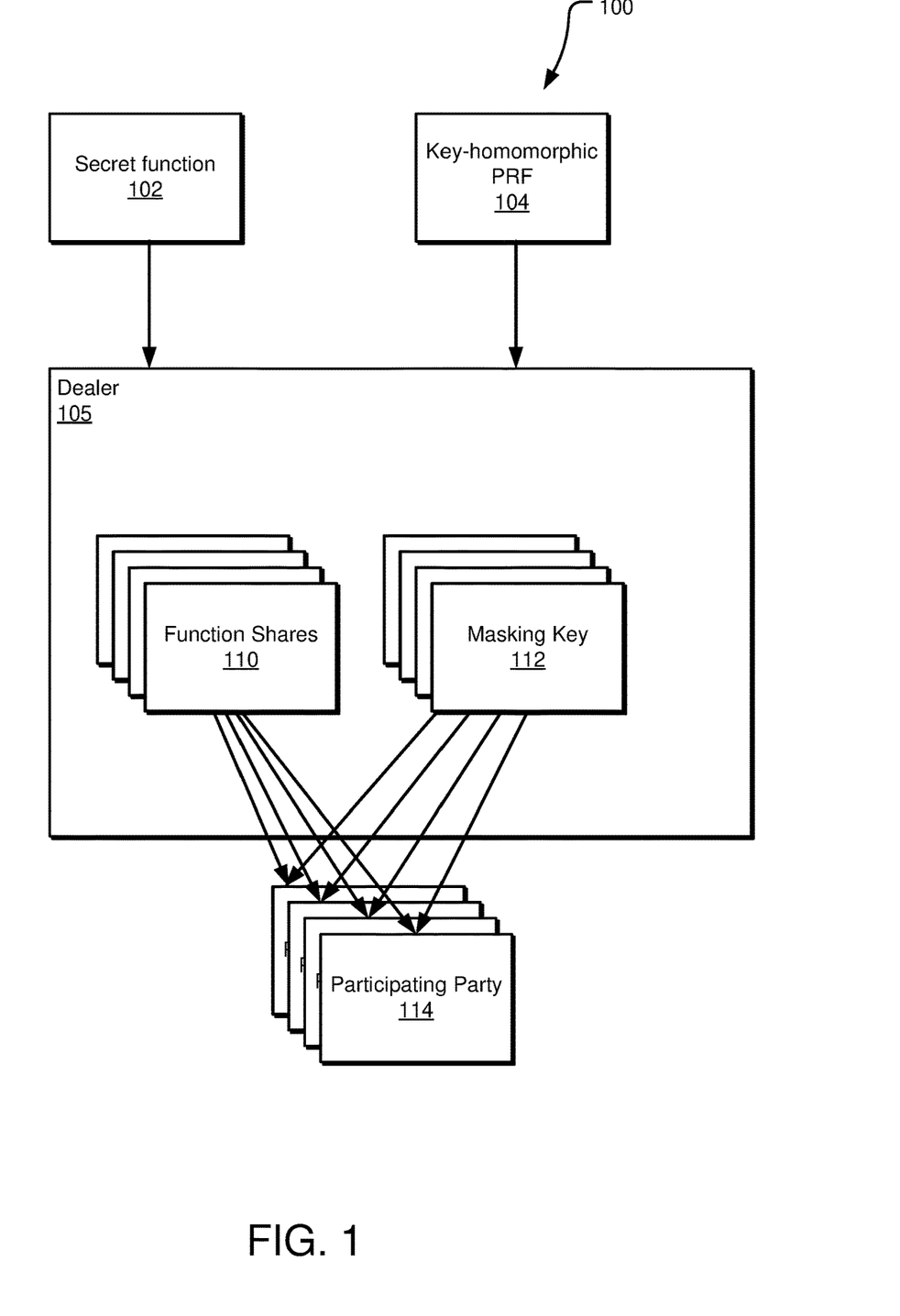
FIG. 1 illustrates a schematic of an example scheme for generating shares distributed to a plurality of parties.

In order to achieve secrecy even after an unlimited number of evaluations, an example scheme 100 is shown in FIG. 1. In the scheme 100 shown in FIG. 1, a secret function $f$ 102 is provided, and a dealer 105 creates function shares $f_1, \ldots, f_n$ 110 generally as described above. In FIG. 1, a key-homomorphic PRF F 104 is also chosen (e.g., by the dealer 105). Accordingly, the dealer 105 generates function shares $f_i$ 110 of the secret function 102 for each participating party $P_i$ 114. In addition, the dealer 105 generates at least one key $k_i$ 112 for the PRF F 104 for each participating party 114. Specifically, a key k of the PRF F 104 is defined such that $k=\Sigma_{i=1}^n k_i$.

Each participating party 114 may evaluate the key-homomorphic PRF F 104 using the respective party's key $k_i$ 112. Because a given party is unaware of the key $k_i$ 112 of the other parties, an output share from another party is masked by a masking component based on the key-homomorphic PRF F such that information regarding the secret function cannot be determined by the other parties, even having received one or more output shares of another party. As such, use of a masking component generated based on a key $k_i$ 112 allows the parties to obfuscate the output share such that multiple evaluations may be conducted without any information regarding the secret function 102 being provided to the parties 114.

Figure 2:
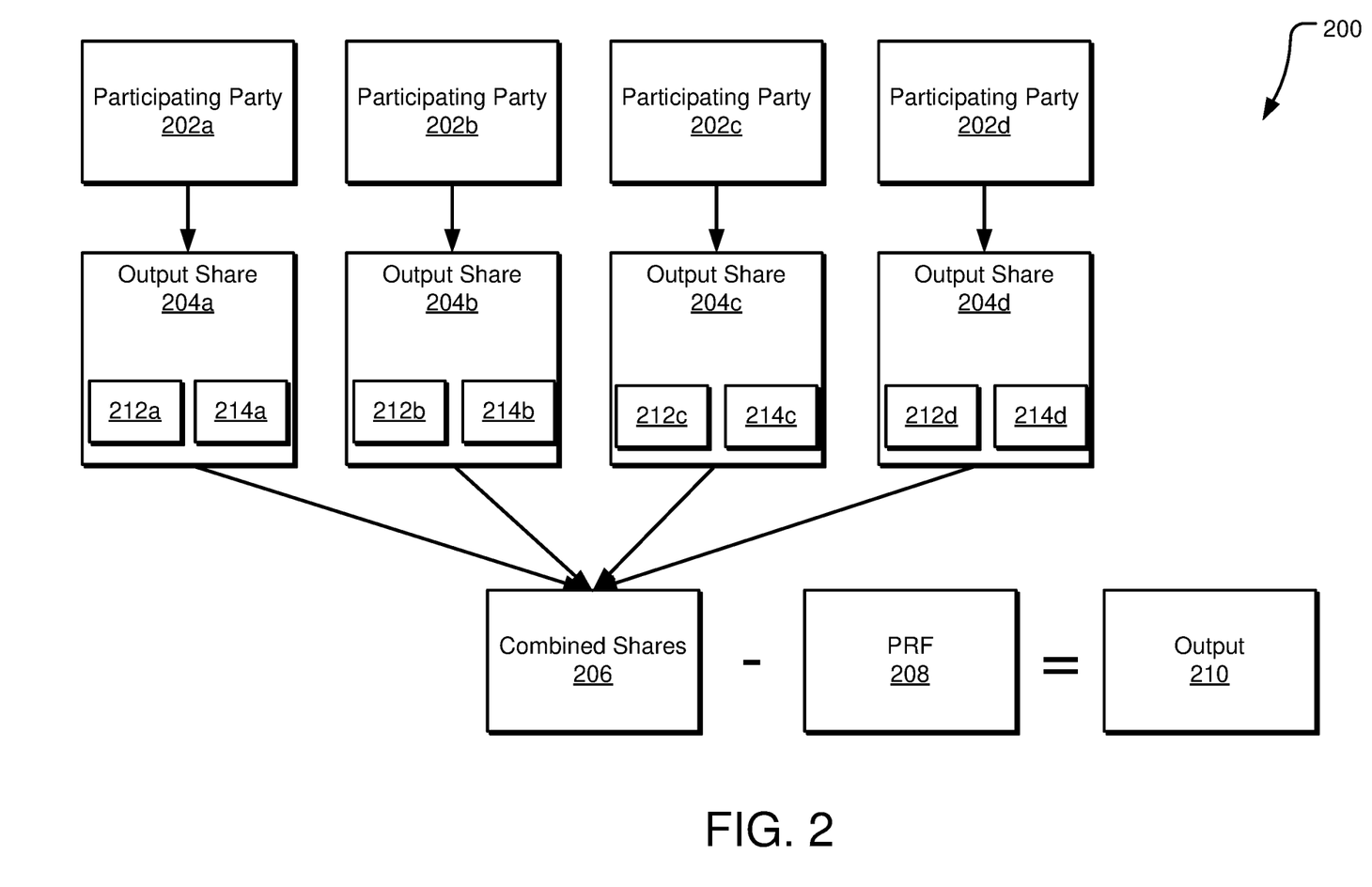
FIG. 2 illustrates a schematic of an example scheme for evaluating a secret function using masked share outputs of a plurality of participating parties.

With further reference to FIG. 2, a scheme 200 is shown for evaluation of a secret function given generation of function shares and keys according to the example scheme 100 shown in FIG. 1. In order to evaluate the secret function $f$ 102 at x, each participating party $P_i$ 202a-202d will compute an output share 204 (e.g., 204a-204d). This output share 204 is at least in part includes an evaluation of the function share $f_i(x)$ 212 that is the evaluation of the function share $f_i$ 110 evaluated at a given function input (x) common to all participating parties. While four participating parties (a first party 202a, a second party 202b, a third party 202c, and a fourth party 202d) are shown in FIG. 2, it may be appreciated that fewer or additional participating parties may be part of the scheme 200 without limitation. Moreover, when referencing a component or value of a given party, the "a," "b," "c," and "d" designators may be used for a given party (e.g., 204a) while general aspects of a component or value common to each party may be described without a given party designation (e.g., 204).

Each participating party 202a-202d also computes a masking component 214. The masking component is a function of the PRF F 104 evaluated using the at least one key $k_i$ 112 of a given party and a common random value (r) that each of the participating parties 202a-202d utilize with their respective masking key $k_i$ 112. The masking component 214 may be calculated independently or as a function of the function share of the party. Each participating party 202a-202d generates a respective output share 204a-204d at least in part based on each party's evaluation of the function share 212 and each party's masking component 214 that is based on the party's at least one key k and the key-homomorphic PRF F 104. Stated mathematically, the output share 204 may be defined as $f_i(x)+F(k_i, r)$, where $f_i(x)$ is the evaluation of the function share 212 and $F(k_i, r)$ is a masking component based on the at least one key $k_i$. The output share 204 does not provide any information regarding the evaluation of the function share 212 of a party or the masking component 214 when provided to other participating parties. That is, the individual components of the evaluation of the function share 212 or masking component 214 are no longer individually discernable to other parties that receive the output share 204.

Accordingly, the participating parties each provide their respective output shares 204a-204d which are combined to generate combined shares 206. Stated mathematically:

$$(f_1(x)+f_2(x)+ \cdots +f_n(x))+(F(k_1,r)+F(k_2,r)+ \cdots + F(k_n,r))=(f_1(x)+f_2(x)+ \cdots +f_n(x))+F(k,r),$$

Once the shared function output 206 has been calculated by summing the masked function outputs 204 from each participating party 202, any or all of the parties 202 may evaluate the PRF F 208 using the key (k) and the common random value (r) (that is, F(k, r) may be calculated). In turn, the PRF F 208 may be subtracted from the shared function output 206 to obtain $f_1(x)+f_2(x)+ \cdots +f_n(x)$, and hence compute the output of the secret function $f(x)$.

The foregoing FSS scheme facilitates a number of improvements over prior FSS approaches. For example, the FSS schemes of the present disclosure provide for an unlimited number of evaluations without leaking information regarding the secret function. Also, as will be described in greater detail below, the solution supports a t-out-of-n threshold FSS scheme, which means that any t parties out of a total of n parties may evaluate the secret function. In addition, the solution is efficient as share sizes are polynomial (e.g., linear) in the size of the function domain (e.g., rather than exponential).

Figure 3:
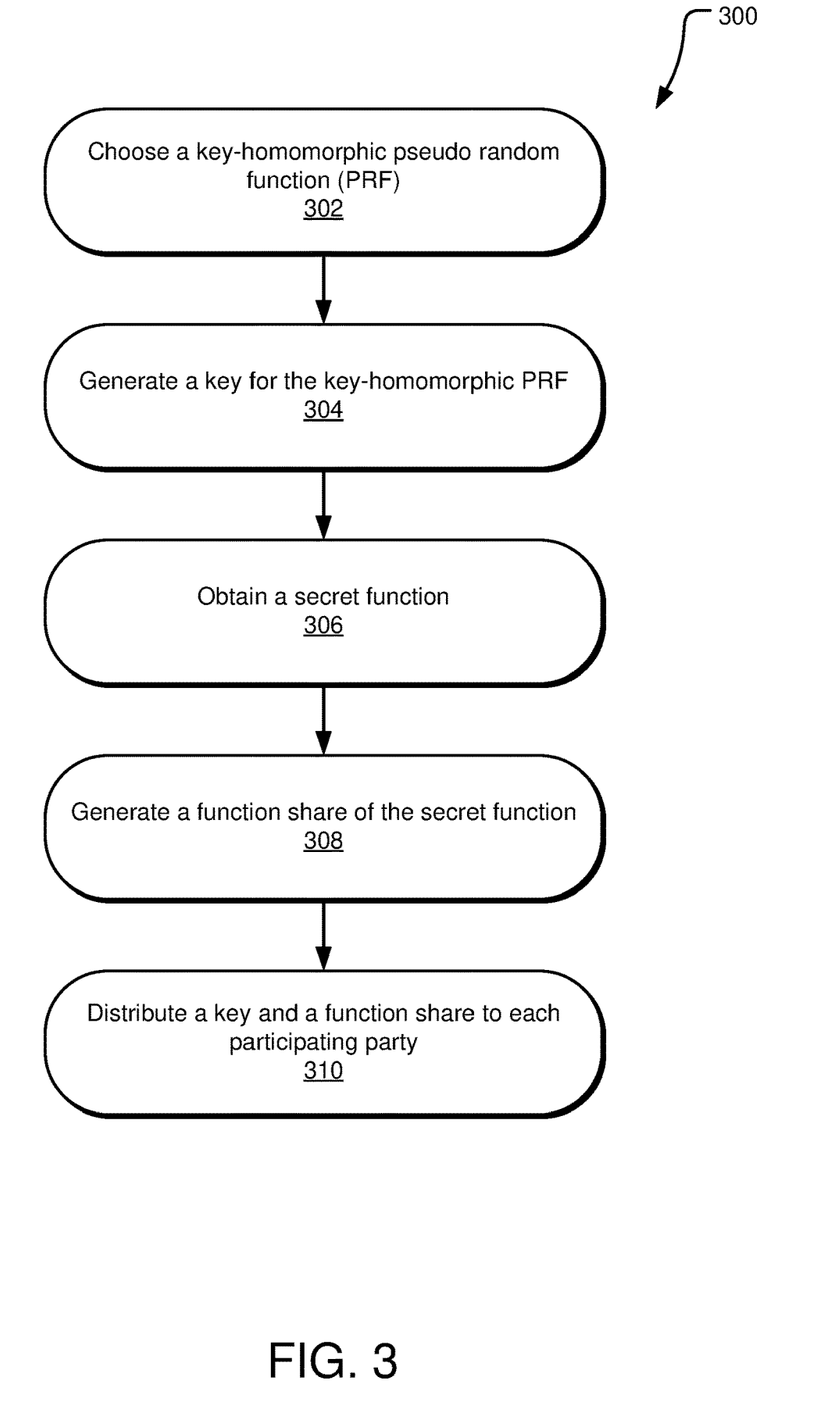
FIG. 3 illustrates example operations for share generation.

FIG. 3 presents example operations 300 for one example of an FSS scheme according to the present disclosure. Specifically, the example operations 300 relate to the creation of an FSS scheme that may performed by a dealer to provide shares to a plurality of participating parties. The activities of the dealer may be performed by a share creation module of a computing device.

In any regard, the example operations 300 include a choosing operation 302 in which a key-homomorphic PRF is selected. Further mathematical details regarding the key-homomorphic PRF are presented below. The operations 300 may also include a generating operation 304 in which at least one key for the key homomorphic PRF 304 is generated for each participating party in the FSS scheme.

The example operations 300 may also include an obtaining operation 306 in which a secret function is obtained. The secret function may be provided to the dealer or may be generated by the dealer according to the further mathematical details presented below. In any regard, the operations 300 may include a generating operation 308 in which a function share of the secret function is generated for each of the plurality of participating parties in the FSS scheme. In turn, a distributing operation 310 is performed in which the at least one key and a function share is distributed to each of the plurality of participating parties. As explained in greater detail below, the function share may include the at least one key. In turn, the key and the function share may be used to generate an output share for use in multiple evaluations of the secret function and operations that will be described below in relation to FIG. 4.

Figure 4:
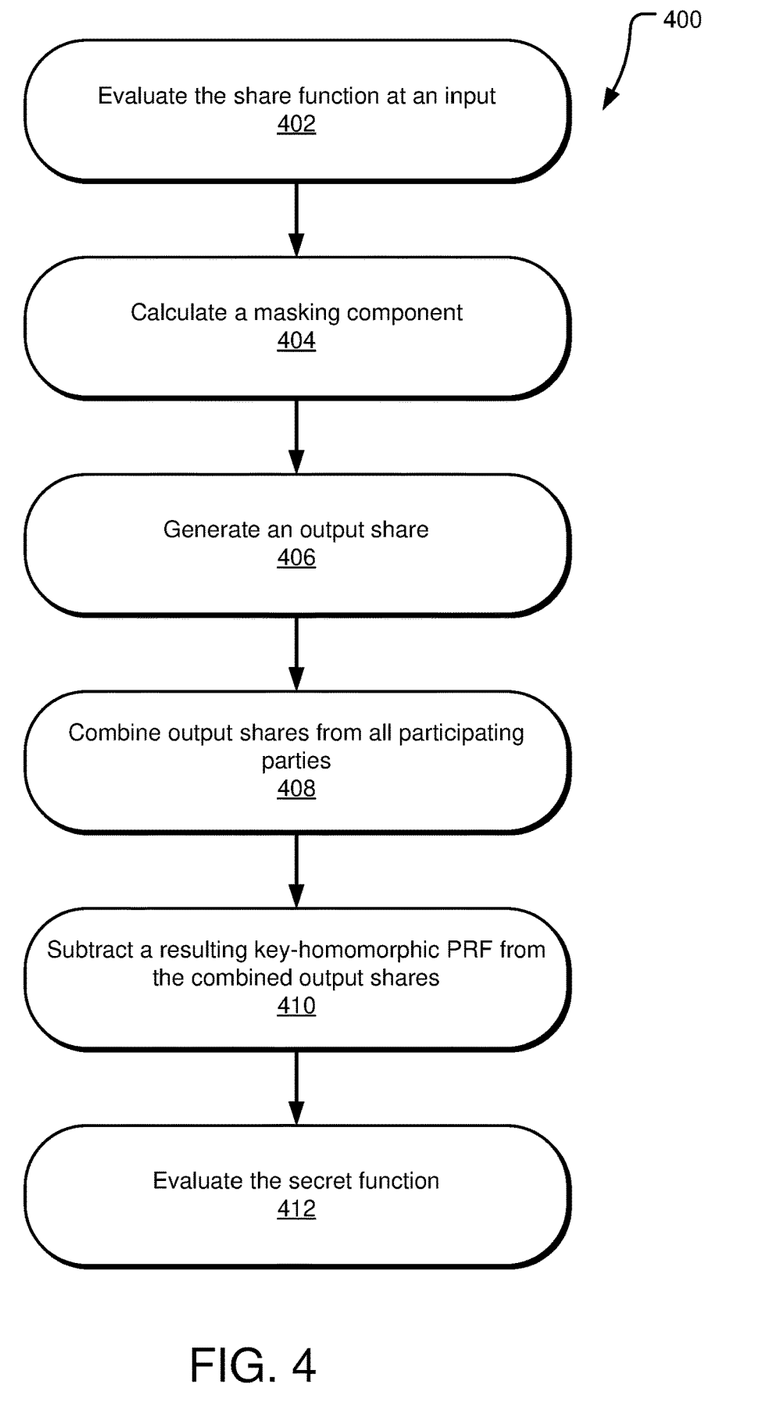
FIG. 4 illustrates example operations for secret function evaluation.

For example, FIG. 4 presents example operations 400 for evaluation of a secret function using distributed keys and function shares of a plurality of participating parties. The operations 400 shown in FIG. 4 may be performed by a function evaluation module at one or more computing devices. For example, the function evaluation module may be provided at a participating party or by another entity that receives information from participating parties.

In any regard, the operations 400 may include an evaluation operation 402 that may be performed by a participating party to evaluate the function share at an input. The function share evaluation may be based on a given party's function share evaluated at a function input. The function input may be common to all participating parties in an attempt to evaluate the secret function.

The operations 400 also include a calculating operation 404 in which a masking component is calculated by each participating party. The masking component may be generated based on a key-homomorphic PRF (e.g., as selected in the choosing operation 302 in FIG. 3). Specifically, the masking component may be generated by evaluating the key-homomorphic PRF using the at least one key of a given participating party and a common random value that each of the plurality of participating parties use when evaluating the key-homomorphic PRF with respect to each party's respective key(s). In addition, each of the plurality of participating parties may perform a generating operation 406 to generate an output share. The output share is generated based on the function share output and the masking component calculated in the calculating operations 402 and 404. As noted above, the output share generated in the generating operation 406 for a given party does not provide any information regarding the individual function share output or masking component of the given party.

In turn, the operations 400 may include a combining operation 408 in which the output shares from all participating parties are combined. The combination of the output shares of all participating parties may result in combined output shares. The operations 400 include a subtracting operation 410 in which a result of the key-homomorphic PRF evaluated using a key and the common random value is subtracted from the combined output shares. In turn, an evaluating operation 412 is performed to evaluate the secret function as a result of the subtracting operation 410.

The following description provides a more robust mathematical explanation of example FSS schemes. Notably, the discussion below provides details of both an n-out-of-n example of a FSS scheme according to the present disclosure, in which all participating parties must provide shared function outputs in order to evaluate the secret-shared function. Thereafter, a t-out-of-n approach is described that facilitates a threshold number (t) of participating parties from all parties (n) in the FSS scheme to participate in evaluation of the secret-shared function. In the following examples, a more robust approach is described. Specifically, use of simple key generation may provide vulnerabilities because any group of parties that includes all but one party may be able to deduce the remaining key of the last party. In turn, the following approach generally uses point functions in a scheme in which the key of a party comprises a plurality of linearly independent keys for the key-homomorphic PRF. Also, the approaches below include use of an input-dependent masking component. As shown below, these features provide further robustness to the approaches described above.

The FSS scheme of the present disclosure may utilize a secret function comprising a point function. As way of initial explanation of such point functions, let A and B be sets, and $\mathcal{P}(A, B)$ be the family of point functions from A to B. The members of $\mathcal{P}(A, B)$ are:

$$p_{a,b}(x) = \begin{cases} b & \text{if } x = a, \\ 0 & \text{otherwise,} \end{cases}$$

for any $a \in A$ and $b \in B$. That is, any point function in the family of point functions evaluates to 0 for any values in which an input x does not equal a.

Threshold sharing of the family of point functions $\mathcal{P}(A, B)$ can be evaluated on a public input x. As noted above, in prior FSS schemes, threshold sharing of some prior approaches leaks information about the point function $p_{a,b} \in \mathcal{P}(A, B)$ if multiple evaluations are performed. The example FSS schemes of the present disclosure rectify this shortcoming of prior approaches by extending the solution such that repeated evaluations do not leak non-negligible information about $p_{a,b}$. The FSS schemes of the present disclosure are generally described herein as multi-evaluation threshold distributed point functions (DPF). As noted above, the present disclosure uses a key-homomorphic PRF family. For a family $\mathcal{P}(\{0,1\}^\ell, \mathbb{F})$ of point functions, security parameter $\lambda$, and a family $\mathcal{F} = \{F: \mathcal{K} \times R \to \mathbb{F}\}$ of key-homomorphic PRFs, the share size of the multi-evaluation DPF scheme is: $(4\ell^2 + 2\lambda\ell + 4\ell + \lambda)\log|\mathbb{F}| + (2\ell + 1)\log|\mathcal{K}|$.

Elaborating on the key-homomorphic PRF described above, in a PRF family F, each function is specified by a key such that it can be evaluated deterministically given the key whereas it behaves like a random function without the key. For a PRF F(k, •), k is called its key or seed. A PRF family F is called key-homomorphic if the set of keys has a group structure and if there is an efficient algorithm that, given $F(k_1, y)$ and $F(k_2, y)$, outputs $F(k_1+k_2, y)$, where + is a group operation applied to the individual outputs $F(k_i, y)$. The key-homomorphic functions used in the present approach may satisfy $F(k_1+k_2, y) = F(k_1, y) + F(k_2, y)$.

Accordingly, Definition 1 provides a computational multi-evaluation threshold DPF scheme. Given a string $a \in \{0,1\}^\ell$ and a value $\alpha \in \mathbb{F}$, a computational multi-evaluation distributed point function scheme for a t-out-of-n threshold structure is defined as a collection of three algorithms: (Gen, Eval, Rec). Gen may be a randomized algorithm that may be used to generate function shares. As will be shown, these function shares may be based on a plurality of linearly independent keys such that the function share may include the linearly independent keys. Eval may be a deterministic algorithm that is used by a party to generate an output share. As will be shown, this output share may be computed using the function share and may include a masking component based on a plurality of linearly independent keys and the input at which the function share is evaluated. Rec may be a deterministic algorithm that is used to evaluate the output shares generated by each participating party using Eval.

With respect to these algorithms, Gen may receive three inputs, $a \in \{0,1\}^\ell$, $\alpha \in \mathbb{F}$, and a security parameter $\lambda \in \mathbb{Z}^+$. In turn, Gen may generate n function shares $\{f_i\}_{i=1}^n$, representing secret shares of a dimension-$\ell$ vector v that has value $\alpha \in \mathbb{F}$ only at the a-th position and is zero at every other position. Eval may receive three inputs, a key $f_i$ (i∈ [n]), x∈ $\{0,1\}^\ell$, and some r∈R, and may output a share $s_i$. Rec may receive the outputs of Eval from t parties and outputs an element of $\mathbb{F}$.

In general, the foregoing algorithms of the FSS scheme satisfy the following three conditions:

Computational Correctness: For all strings a∈ $\{0,1\}^\ell$, output values α∈ $\mathbb{F}$, r∈R, keys $\{f_i\}_{i=1}^n$←Gen(a, α, λ) and subsets T⊆[n] of size t, it holds that:
Pr[Rec($\{$Eval($f_i$, a, r)$\}_{i\in T}$)=α]=1 and for all strings x∈ $\{0,1\}^\ell$, x≠a, Pr[Rec($\{$Eval($f_i$, x, r)$\}_{i\in T}$)=0]>1−negl(λ).

Perfect Secrecy: For all strings a, b∈ $\{0,1\}^\ell$, output values α, β∈ $\mathbb{F}$, λ∈ $\mathbb{Z}^+$, keys $\{f_i\}_{i=1}^n$←Gen(a, α, λ) and $\{f'_i\}_{i=1}^n$←Gen(b, β, λ) and subset S⊂[n] of size<t, it holds that $\{f_i\}_{i\in S}$ and $\{f'_i\}_{i\in S}$ are perfectly indistinguishable.

Computational Multi-evaluation: For all strings a, b∈ $\{0,1\}^\ell$, output values α, β∈ $\mathbb{F}$, λ∈ $\mathbb{Z}^+$, keys $\{f_i\}_{i=1}^n$←Gen(a, α, λ) and $\{f'_i\}_{i=1}^n$←Gen(b, β, λ), it holds for all strings $x_1, x_2, \ldots, x_m$≠a, b and $r_1, r_2, \ldots, r_m$∈R distinct, and subset S⊂[n] of size<t, that ($\{f_i\}_{i\in S}$, $\{$Eval($f_i$, $x_h$, $r_h$)$\}_{i\in [n], h\in [m]}$), ($\{f'_i\}_{i\in S}$, $\{$Eval($f'_i$, $x_h$, $r_h$)$\}_{i\in [n], h\in [m]}$) are computationally indistinguishable with respect to λ.

In view of the foregoing preliminaries, an n-out-of-n FSS scheme is described that uses a computational multi-evaluation DPF for the class of point functions $\mathcal{P}(\{0,1\}^\ell, \mathbb{F})$, where $\mathbb{F} = \mathbb{F}_q$ is the finite field with cardinality q. Initially, let $P_1, \ldots, P_n$ denote the n parties. A family of key-homomorphic PRFs may be provided as:

$$\mathcal{F} = \{F^{(\lambda)}: \mathcal{K}^{(\lambda)} \times R \to \mathbb{F}^{2\ell+\lambda+1}\}$$

such that the advantage of any polynomial-time adversary in distinguishing $F^{(\lambda)}$ from random is negligible in λ. A definition may include $F^{(\lambda)}=(F_1^{(\lambda)}, F_2^{(\lambda)})$ with $F_1^{(\lambda)}$: $\mathcal{K}^{(\lambda)} \times R \to \mathbb{F}^{2\ell+\lambda}$ and $F_2^{(\lambda)}: \mathcal{K}^{(\lambda)} \times R \to \mathbb{F}$. Also, it may be defined F for $F^{(\lambda)}$ (and similarly, $F_k$ for $F_k^{(\lambda)}$ and $\mathcal{K}$ for $\oplus^{(\lambda)}$) when λ is clear from context.

It may be assumed that $\mathcal{K}^{(\lambda)}$ is an abelian group and that the order of any element in $\mathcal{K}^{(\lambda)}$ is bounded by some polynomial γ(λ). This is assumption is often the case; in particular, this assumption holds when $\mathcal{K}^{(\lambda)} = \mathbb{Z}_{h(\lambda)}^{g(\lambda)}$, where g(λ) is an arbitrary function of λ and h(λ) is polynomially bounded. Because $|\mathcal{K}^{(\lambda)}|$ is superpolynomial in λ, if the above conditions hold, then there exists $\lambda_0$ such that $$\frac{\gamma(\lambda)^{2\ell n}}{|\mathcal{K}^{(\lambda)}|} < 1 - \frac{1}{\lambda} \text{ for all } \lambda \geq \lambda_0.$$

Hence, by replacing λ by a larger λ' if needed and truncating the output, it may be assumed that $$\frac{\gamma(\lambda)^{2\ell n}}{|\mathcal{K}^{(\lambda)}|} < 1 - \frac{1}{\lambda}$$

holds for all λ.

If $\mathbb{F}$ has characteristic p, then for any k∈ p$\mathcal{K}$, r∈R, $$F(k,r) = F(pk', r) = pF(k', r) = 0.$$

Thus, any key k∈ p$\mathcal{K}$ is a "weak key," and because F is a secure PRF, $|\mathcal{K}/p\mathcal{K}|^{-1}$ must be a negligible function of λ. By the fundamental theorem of finite abelian groups, it follows that:

$$\mathcal{K} \cong \mathbb{Z}/(p_1^{n_1}\mathbb{Z}) \times \mathbb{Z}/(p_2^{n_2}\mathbb{Z}) \times \ldots \times \mathbb{Z}/(p_l^{n_l}\mathbb{Z})$$

where $p_1, \ldots, p_l$ are (not necessarily distinct) primes. Assume $p_i = p$ for $1 \leq i \leq l'$ and that $p_i \neq p$ for $l' < i \leq l$. Then $\mathbb{Z}/p\mathbb{Z} \cong (\mathbb{Z}/p\mathbb{Z})^{l'}$ and thus $|\mathbb{Z}/p\mathbb{Z}|^{-1} = 1/p^{l'}$ must be a negligible function of λ.

In view of the foregoing, an example operation of each of the algorithms Gen, Eval, and Rec are described. With respect to Gen, for the Gen algorithm having inputs a, α, and λ (stated differently, Gen(a, α, λ)), one may choose 2$\ell$ random vectors $v_0, v_1, v_2, \ldots, v_{i,2\ell-1}$ from $\mathbb{F}^{2\ell+\lambda}$. In addition, one may choose 2$\ell$ n random vectors $v_{i,j} \in \mathbb{F}^{2\ell+\lambda}$ (1≤i≤n, 0≤j≤2$\ell$−1) subject to the condition $v_j = \Sigma_{i=0}^n v_{i,j}$ for all j. Let a=$a_1 a_2 \ldots a_\ell$ and compute $\theta = \Sigma_{j=0}^{\ell-1} v_{2j+a_j}$. This sum includes either $v_{2j}$ or $v_{2j+1}$ depending on whether the j-th bit of a is 0 or 1 respectively. One may also choose 2$\ell$ random elements $\alpha_0, \alpha_1, \ldots, \alpha_{2\ell-1} \in \mathbb{F}$ subject to the condition $\alpha = \Sigma_{j=0}^{\ell-1} \alpha_{2j+a_j}$. Also, choose 2$\ell$ n random elements $\alpha_{i,j} \in \mathbb{F}$ (1≤i≤n, 0≤j≤2$\ell$−1) subject to the condition that $\alpha_j = \Sigma_{i=1}^n \alpha_{i,j}$ for all j. One may also choose 2$\ell$ n linearly independent keys $k_{i,j}$ (1≤i≤n, 0≤j≤2$\ell$−1) for F. In turn, one may compute $k = \Sigma_{i=1}^n \Sigma_{j=0}^{\ell-1} k_{i,2j+a_j}$ and output using Gen $f_i = (v_{i,0}, \ldots, v_{i,2\ell-1}, \theta, \alpha_{i,0}, \ldots, \alpha_{i,2\ell-1}, k_{i,0}, \ldots, k_{i,2\ell-1}, k)$.

Describing the algorithm Eval, inputs $f_i$, x, and r may be provided (Eval($f_i$, x, r)). The function share $f_i$ may be parsed as $$f_i = (v_{i,0}, \ldots, v_{2\ell-1}, \theta, \alpha_{i,0}, \ldots, \alpha_{i,2\ell-1}, k_{i,0}, \ldots, k_{i,2\ell-1}, k).$$

Let $x = x_1 x_2 \ldots x_\ell$. In turn, one may compute $s_{i,0} = \Sigma_{j=0}^{\ell-1} (v_{i,2j+x_j} + F_1(k_{i,2j+x_j}, r))$. Also, one may compute $s_{i,1} = \Sigma_{j=0}^{\ell-1} (\alpha_{i,2j+x_j} + F_2(k_{i,2j+x_j}, r))$. In turn, an output of Eval may be provided as $s_i = (s_{i,0}, s_{i,1}, r, \theta, k)$.

For the algorithm Rec, inputs $s_1, \ldots, s_n$ may be provided (Rec($s_1, \ldots, s_n$)). Initially, $s_i$ may be parsed as ($s_{i,0}, s_{i,1}, r, \theta, k$). In turn, one may compute $\Sigma_{i=0}^n s_{i,0}$. If this equals $\theta + F_1(k, r)$, Rec outputs $\Sigma_{i=0}^n s_{i,1} - F_2(k, r)$ else Rec outputs 0.

In the above scheme, each party has a share size of $$(4\ell^2 + 2\lambda\ell + 4\ell + \lambda)\log|\mathbb{F}| + (2\ell + 1)\log|\mathcal{K}|,$$

and the output of Eval for each party has size $$(4\ell + 2\lambda + 1)\log|\mathbb{F}| + \log|\mathcal{K}| + \log|R|,$$

both of which are independent of the number of parties.

The following provides proof of Theorem 1: The above scheme is an n-out-of-n computational multi-evaluation DPF scheme for sharing the class of point functions $\mathcal{P}(\{0,1\}^\ell, \mathbb{F})$. That is, the following demonstrates that the scheme follows the three conditions noted above for an n-out-of-n computational multi-evaluation DPF scheme.

Initially, in relation to computational correctness, it may be proven that evaluation at x=a gives the correct result with probability 1, or stated mathematically:

$$\text{Rec}(\{\text{Eval}(f_i, a, r)\}_{i \in T}) = \alpha.$$

Note that $$\sum_{i=0}^{n} s_{i,0} = \sum_{i=0}^{n} \sum_{j=0}^{\ell-1} \left(v_{i,2j+a_j} + F_1(k_{i,2j+a_j}, r)\right)$$

$$= \sum_{j=0}^{\ell-1} \sum_{i=0}^{n} v_{i,2j+a_j} + \sum_{i=0}^{n} \sum_{j=0}^{\ell-1} F_1(k_{i,2j+a_j}, r)$$

$$= \sum_{j=0}^{\ell-1} v_{2j+a_j} + F_1\left(\sum_{i=0}^{n} \sum_{j=0}^{\ell-1} k_{i,2j+a_j}, r\right)$$

$$= \theta + F_1(k, r),$$

so the output of Rec is $$\sum_{i=0}^{n} s_{i,1} - F_2(k, r) = \sum_{i=0}^{n} \sum_{j=0}^{\ell-1} \left(\alpha_{i,2j+a_j} + F_2(k_{i,2j+a_j}, r)\right) - F_2(k, r) =$$

$$\sum_{j=0}^{\ell-1} \sum_{i=0}^{n} \alpha_{i,2j+a_j} + \sum_{i=0}^{n} \sum_{j=0}^{\ell-1} F_2(k_{i,2j+a_j}, r) - F_2(k, r) = \sum_{j=0}^{\ell-1} \alpha_{2j+a_j} +$$

$$F_2\left(\sum_{i=0}^{n} \sum_{j=0}^{\ell-1} k_{i,2j+a_j}, r\right) - F_2(k, r) = \alpha + F_2(k, r) - F_2(k, r) = \alpha.$$

Next, it may be proven that evaluation at $x \neq a$ is correct except with probability negligible in $\lambda$. Let $u_j = v_j + F_1(k_j, r)$ for $j = 0, \ldots, 2\ell - 1$, where $k_j = \sum_{i=1}^{n} k_{i,j}$. A simple calculation shows that $$\sum_{j=0}^{\ell} u_{2j+a_j} = \sum_{j=0}^{\ell-1} ((v_{2j+a_j} + F_1(k_{2j+a_j}, r)) = \theta + F_1(k, r).$$

Because $F_1$ is a PRF and $k_0, k_1, \ldots, k_{2\ell-1}$ are linearly independent, the vectors $u_0, u_1, \ldots, u_{2\ell-1}$ cannot be distinguished from random vectors in $\mathbb{F}^{2\ell+\lambda}$ except with probability negligible in $\lambda$. Now, the probability that $2\ell$ random vectors are linearly independent in $\mathbb{F}^{2\ell+\lambda}$ is $$\prod_{j=0}^{2\ell-1} \left(\frac{q^{2\ell+\lambda} - q^j}{q^{2\ell+\lambda}}\right) = \prod_{j=0}^{2\ell-1} \left(1 - \frac{q^j}{q^{2\ell+\lambda}}\right) > 1 - \sum_{j=0}^{2\ell-1}\left(\frac{q^j}{q^{2\ell+\lambda}}\right) =$$

$$1 - \frac{1}{q^{2\ell+\lambda}}\left(\frac{q^{2\ell}-1}{q-1}\right) > 1 - \frac{1}{q^\lambda} = 1 - negl(\lambda).$$

If the vectors $u_0, u_1, \ldots, u_{2\ell-1}$ are linearly independent, then there is no other linear combination of the $u_j$'s that result in $\theta + F_1(k, r)$, and thus, Rec will output 0 when given as inputs the outputs of Eval evaluated at $x \neq a$. Therefore, this shows that the output of Rec will be 0 except with probability negligible in $\lambda$.

Regarding the condition of perfect secrecy, recall that Gen($a, \alpha, \lambda$) outputs $(f_1, f_2, \ldots, f_n)$, where $$f_i = (v_{i,0}, \ldots, v_{i,2\ell-1}, \theta, \alpha_{i,0}, \ldots,$$

$$\alpha_{i,2\ell-1}, k_{i,0}, \ldots, k_{i,2\ell-1}, k).$$

Given $f_i$ from $n-1$ parties, which can be assumed, without loss of generality, to be the first $n-1$ parties, note that $v_{i,j}$ ($1 \leq i \leq n-1$, $0 \leq j \leq 2\ell - 1$) and $\theta$ are independent (in the probabilistic sense) elements from the uniform distribution on $\mathbb{F}^{2\ell+\lambda}$, $\alpha_{i,j}$ ($1 \leq i \leq n-1$, $0 \leq j \leq 2\ell - 1$) are independent elements from the uniform distribution on $\mathbb{F}$, while $k_{i,j}$ ($1 \leq i \leq n-1$, $0 \leq j \leq 2\ell - 1$) and $k$ are $2\ell(n-1)+1$ linearly independent elements picked uniformly at random from $\mathcal{K}$. Thus, $(f_1, \ldots, f_{n-1})$ has the same distribution regardless of the value of $a \in \{0,1\}^\ell$ and $\alpha \in \mathbb{F}$.

Regarding the ability for computational multi-evaluation, let $S \subset [n]$ such that $|S| < n$. It is established above that $\{f_i\}_{i \in S}$ has the same distribution for all $a \in \{0,1\}^\ell$ and $\alpha \in \mathbb{F}$. Assume that $x_1, x_2, \ldots, x_m \neq a$ and $r_1, r_2, \ldots, r_m \in R$ are distinct. Accordingly, it may be calculated that:

$$Eval(f_i, x_h, r_h) = \left(\sum_{j=0}^{\ell-1}\left(v_{i,2j+x_{h,j}} + F_1(k_{i,2j+x_{h,j}}, r_h)\right),\right.$$

$$\sum_{j=0}^{\ell-1} \left(\alpha_{i,2j+x_{h,j}} + F_2(k_{i,2j+x_{h,j}}, r_h)\right), r_h, \theta, k\Big) =$$

$$\left(\sum_{j=0}^{\ell-1} v_{i,2j+x_{h,j}} + F_1\left(\sum_{j=0}^{\ell-1} k_{i,2j+x_{h,j}}, r_h\right),\right.$$

$$\sum_{j=0}^{\ell-1} \alpha_{i,2j+x_{h,j}} + F_2\left(\sum_{j=0}^{\ell-1} k_{i,2j+x_{h,j}}, r_h\right) r_h, \theta, k\Big).$$

Because $\{f_i\}_{i \in S}$ has the same distribution regardless of the choice of $a$ and $\alpha$, the same holds for $(\{f_i\}_{i \in S}, \{Eval(f_i, x_h, r_h)\}_{i \in S, h \in [m]})$.

It may be observed that because $x_h \neq a$ for all $1 \leq h \leq m$, for any fixed h, the set $$\{k_{i,j} : i \in S, 0 \leq j \leq 2\ell - 1\} \cup \{k\} \cup \{\sum_{j=0}^{\ell-1} k_{i,2j+x_{h,j}} : i \notin S\}$$

is a set of random linearly independent elements in $\mathcal{K}$.

Hence, any non-zero linear combination of $\{\sum_{j=0}^{\ell-1} k_{i,2j+x_{h,j}} : i \in S\}$ is a uniformly random element in $\mathcal{K}$ that lies outside the span of $\{k\} \cup \{k_{i,j} : i \in S, 0 \leq j \leq 2\ell-1\}$.

Because, by assumption, any element in $\mathcal{K}$ has order at most $\gamma(\lambda)$, the span of $2\ell(n-1)+1$ elements has size at most $\gamma(\lambda)^{2\ell(n-1)+1} < \gamma(\lambda)^{2\ell n}$. By this assumption, $$\frac{\gamma(\lambda)^{2\ell n}}{|\mathcal{K}^{(\lambda)}|} < 1 - \frac{1}{\lambda},$$

so the advantage of an adversary in distinguishing the PRF F from random when the key is selected from outside the span of $\{k\} \cup \{k_{i,j} : i \in T, 0 \leq j \leq 2\ell - 1\}$ is increased by a factor of at most $\lambda$, and hence this advantage is still negligible in $\lambda$.

Accordingly, given $\{f_i\}_{i \in S}$, the set $\{F(\sum_{j=0}^{\ell-1} k_{i,2j+x_{h,j}}, r_h)\}_{i \notin S, h \in [m]}$ cannot be distinguished from uniformly random except with negligible probability. It follows that for all $i \notin S$ and $h \in [m]$, $\sum_{j=0}^{\ell-1} v_{i,2j+x_{h,j}} + F_1(\sum_{j=0}^{\ell-1} k_{i,2j+x_{h,j}}, r_h)$ and $\sum_{j=0}^{\ell-1} \alpha_{i,2j+x_{h,j}} + F_2(\sum_{j=0}^{\ell-1} k_{i,2j+x_{h,j}}, r_h)$ are indistinguishable from independent uniform random elements of $\mathbb{F}^{2\ell+\lambda}$ and $\mathbb{F}$ respectively, except with probability negligible in $\lambda$.

In addition to the n-out-of-n scheme discussed above in which all parties n of a scheme must participate to evaluate the secret-shared function, the general approach of the multi-evaluation threshold DPF may also facilitate a threshold case or a t-out-of-n FSS scheme. That is, the FSS approach described herein may allow for establishing a scheme in which a threshold number, but not necessarily all, of the participating parties may evaluate the secret-shared function.

In this example, a $\mathbb{F}$-key-homomorphic PRF is introduced. By assuming the existence of such PRFs, the n-out-of-n scheme in the previous section may be expanded to a t-out-of-n computational multi-evaluation threshold DPF scheme.

Definition 2 for a $\mathbb{F}$-key-homomorphic PRF is provided, where one lets $\mathbb{F}$ be a field, $\mathcal{K}$ and $\mathbb{L}$ be extension fields of $\mathbb{F}$, and $F: \mathcal{X} \to \mathbb{L}^m$ be an efficiently computable function. It may be that F is a $\mathbb{F}$-key-homomorphic PRF if the following three properties hold:

1. F is a secure PRE
2. $\forall k_1, k_2 \in \mathcal{K}, x \in \mathcal{X}: F_{k_1+k_2}(x) = F_{k_1}(x) + F_{k_2}(x)$,
3. $\forall c \in \mathbb{F}, k \in \mathcal{K}, x \in \mathcal{X}: F_{ck}(x) = c \cdot F_k(x)$.

Note that if $\mathcal{K}$ and $\mathbb{L}$ are fields with the same prime subfield $\mathbb{F}_p$, then a key-homomorphic PRF $F: \mathcal{K} \times \mathcal{X} \to \mathbb{L}^m$ is always $\mathbb{F}_p$-key-homomorphic. Furthermore, since $\mathcal{K}$ is a finite field, it is known that $(\mathcal{K}, +) \cong \mathbb{F}_{p'}^l$ for some prime p'. Then, by the definition provided above that $\mathbb{F}$ has characteristic p, then for any $k \in p\mathcal{K}$, $r \in R$, $F(k, r) = F(pk', r) = pF(k', r) = 0$:

$$|\mathcal{K}/p\mathcal{K}|^{-1} = \begin{cases} 1/p^l & \text{if } p = p', \\ 1 & \text{otherwise.} \end{cases}$$

Because F is a secure PRF, $|\mathcal{K}/p\mathcal{K}|^{-1}$ is a negligible function of $\lambda$, thus it must be the case that p'=p, i.e. $\text{char}(\mathcal{K})$ must be equal to $\text{char}(\mathbb{L})$.

A $\mathbb{F}$-key-homomorphic PRF family may be used to produce a computational multi-evaluation threshold DPF scheme for the class of point functions $\mathcal{P}(\{0,1\}^\ell, \mathbb{L})$, where $\mathbb{L} = \mathbb{F}_q$ is the finite field with cardinality q. Assume $|\mathbb{F}| \geq n+1$, and fix an injection $\iota: \{0, 1, \ldots, n\} \to \mathbb{F}$. This injection may be used to identity elements in $\{0, 1, \ldots, n\}$ with elements of $\mathbb{F}$. Note that this injection need not be a homomorphism. Let $$\mathcal{F} = \{F^{(\lambda)}: \mathcal{K}^{(\lambda)} \times R \to \mathbb{L}^{2\ell+\lambda+1}\}$$

be a family of $\mathbb{F}$-key-homomorphic PRFs such that the advantage of any polynomial-time adversary in distinguishing $F^{(\lambda)}$ from random is negligible in $\lambda$. As above, it may be that $F^{(\lambda)} = (F_1^{(\lambda)}, F_2^{(\lambda)})$.

Again, it may be assumed that the order of any element in $\mathcal{K}^{(\lambda)}$ is bounded by some polynomial $\gamma(\lambda)$, from which it follows, without loss of generality, that $$\frac{\gamma(\lambda)^{2\ell n}}{|\mathcal{K}^{(\lambda)}|} < 1 - \frac{1}{\lambda}$$

holds for all $\lambda$.

Accordingly, for the algorithm Gen(a, $\alpha$, $\lambda$), one may choose $2\ell$ random vectors $v_0, v_1, v_2, \ldots, v_{2\ell-1}$ rom $\mathbb{L}^{2\ell+\lambda}$. Also, Shamir shares $v_{i,j} \in \mathbb{L}^{2\ell+\lambda}$ ($1 \leq i \leq n$, $0 \leq j \leq 2\ell-1$) may be computed for $v_j$. To be precise, for each $0 \leq j \leq 2\ell-1$, one may randomly choose polynomials $r_{j,h}(X) \in \mathbb{L}[X]$ ($1 \leq h \leq 2\ell+\lambda$), each of degree $\leq t-1$, such that $r_{j,h}(0)$ is equal to the h-th coordinate of $v_j$, and let the h-th coordinate of $v_{i,j}$ be $r_{j,h}(i)$.

Let $a = a_1 a_2 \ldots a_\ell$ and one may compute $\theta = \sum_{j=0}^{\ell-1} v_{2j+a_j}$. In turn, one may choose $2\ell$ random elements $\alpha_0, \alpha_1, \ldots, \alpha_{2\ell-1} \in \mathbb{L}$ subject to the condition $\alpha = \sum_{j=0}^{\ell-1} \alpha_{2j+a_j}$. In turn, one may compute Shamir shares $\alpha_{i,j} \in \mathbb{L}$ ($1 \leq i \leq n$, $0 \leq j \leq 2\ell-1$) for $\alpha_j$, as was done above. In addition, one may choose $2\ell n$ linearly independent keys $k_{i,j}$ ($1 \leq i \leq n$, $0 \leq j \leq 2\ell-1$) for F. Furthermore, one may choose random polynomials $p_{i,j}(X) \in \mathcal{K}[X]$ ($1 \leq i \leq n$, $0 \leq j \leq 2\ell-1$), each of degree $\leq t-1$ such that $p_{i,j}(0) = k_{i,j}$, and let $k_{i,j,l} = p_{i,j}(l)$ ($1 \leq l \leq n$). Let $$k^{(l)} = \{(i, j, k_{i,j,l}) : 1 \leq i \leq n, 0 \leq j \leq 2\ell-1\}.$$

In turn, one may compute $k = \sum_{i=1}^{n} \sum_{j=0}^{\ell-1} k_{i,2j+a_j}$ and Gen outputs:

$$f_i = (i, v_{i,0}, \ldots, v_{i,2\ell-1}, \theta, \alpha_{i,0}, \ldots, \alpha_{i,2\ell-1}, k_{i,0}, \ldots, k_{i,2\ell-1}, k^{(i)}, k).$$

For the algorithm Eval($f_i$, x, r), one may parse $f_i$ as $$f_i = (i, v_{i,0}, \ldots, v_{i,2\ell-1}, \theta, \alpha_{i,0}, \ldots, \alpha_{i,2\ell-1}, k_{i,0}, \ldots, k_{i,2\ell-1}, k^{(i)}, k).$$

Let $x = x_1 x_2 \ldots x_\ell$ and compute:

$$s_{i,0} = \sum_{j=0}^{\ell-1} (v_{i,2j+x_j} + \sum_{l=1}^{n} (k_{1,2j+x_j,i}, r)).$$

Also, one may compute:

$$S_{i,1} = \sum_{j=0}^{\ell-1} (\alpha_{i,2j+x_j} + \sum_{l=1}^{n} (k_{i,2j+x_j,i}, r)).$$

A resulting output of Eval is $s_i = (i, s_{i,0}, s_{i,1}, r, \theta, k)$

In relation to the algorithm Rec($\{s_i : i \in T\}$), one may parse $s_i$ as $(i, s_{i,0}, s_{i,1}, r, \theta, k)$ and compute $S_{0,1}(X), \ldots, S_{0,2\ell+\lambda}(X)$ and $S_1(X)$, polynomials of degree t-1 such that $S_{0,h}(i)$ is equal to the h-th coordinate of $s_{i,0}$ and $S_1(i) = s_{i,1}$ for all $i \in T$. If $(S_{0,1}(0), \ldots S_{0,2\ell+\lambda}(0))$ equals $\theta + F_1(k, r)$, Rec outputs $S_1(0) - F_2(k, r)$ else Rec outputs 0.

Accordingly, each party has a share size of $$\log n + (4\ell^2 + 2\lambda\ell + 4\ell + \lambda) \log |\mathbb{L}| + (2\ell n + 2\ell + 1) \log |\mathcal{K}|$$

(assuming an ordering for the elements in $k^{(l)}$ is fixed). One may replace (i, j, $k_{i,j,l}$) by $k_{i,j,l}$) and the output of Eval has size:

$$\log n + (4\ell + 2\lambda + 1) \log |\mathbb{L}| + \log |\mathcal{K}| + \log |R|.$$

Accordingly, Theorem 2 states that the above scheme is an t-out-of-n computational multi-evaluation DPF scheme for sharing the class of point functions $\mathcal{P}(\{0,1\}^\ell, \mathbb{L})$. Before proving Theorem 2, two useful lemmas may be provided:

Lemma 1

Let $x_0, x_1, \ldots, x_t \in \mathbb{F}$ be distinct, $\mathcal{K}$ be an extension field of $\mathbb{F}$ and let $p(X) \in \mathcal{K}[X]$ be a polynomial of degree $\leq t-1$. Then there exists $c_1, c_2, \ldots, c_t \in \mathbb{F}$ such that $$p(x_0) = c_1 p(x_1) + \ldots + c_t p(x_t).$$

By Lagrange interpolation, $$p(X) = p(x_1) \cdot \frac{\prod_{i \neq 1}(X - x_i)}{\prod_{i \neq 1}(x_1 - x_i)} + \cdots + p(x_t) \cdot \frac{\prod_{i \neq t}(X - x_i)}{\prod_{i \neq t}(x_t - x_i)},$$

So:

$$p(x_0) = p(x_1) \cdot \frac{\prod_{i \neq 1}(x_0 - x_i)}{\prod_{i \neq 1}(x_1 - x_i)} + \cdots + p(x_t) \cdot \frac{\prod_{i \neq t}(x_0 - x_i)}{\prod_{i \neq t}(x_t - x_i)}.$$

From the foregoing, it is clear that $$c_j = \frac{\prod_{i \neq j}(x_0 - x_i)}{\prod_{i \neq j}(x_j - x_i)}$$

lies in the subfield $\mathbb{F}$ since $x_0, x_1, \ldots, x_t \in \mathbb{F}$.

Lemma 2:

Let $F: \mathcal{K} \times X \to \mathbb{L}$ be an $\mathbb{F}$-key-homomorphic PRF, $x_0$, $x_1, \ldots, x_t \in \mathbb{F}$ be distinct, and $p(X) \in \mathcal{K}[X]$ be a polynomial of degree $\leq t-1$. Then:

1. $F(p(x_0), r)$ can be computed from $F(p(x_i), r)$ $(1 \leq i \leq t)$.
2. There exists a polynomial $\delta(X) \in \mathbb{L}[X]$ of degree $\leq t-1$ such that $\delta(x_i) = F(p(x_i), r)$ for all $0 \leq i \leq t$. Because $F$ is $\mathbb{F}$-key-homomorphic, $$F(p(x_0), r) = c_1 \cdot F(p(x_1), r) + \ldots + c_t \cdot F(p(x_t), r),$$

where $c_1, \ldots c_t \in \mathbb{F}$ are as in Lemma 1. Also, let $\delta(X)$ be the polynomial $$\delta(X) = F(p(x_1), r) \cdot \frac{\prod_{i \neq 1}(X - x_i)}{\prod_{i \neq 1}(x_1 - x_i)} + \cdots + F(p(x_t), r) \cdot \frac{\prod_{i \neq t}(X - x_i)}{\prod_{i \neq t}(x_t - x_i)}.$$

Accordingly, $\delta(x_i) = F(p(x_i), r)$ for $1 \leq i \leq t$. And, by the foregoing discussion:

$$F(p(x_0), r) =$$

$$F(p(x_1), r) \cdot \frac{\prod_{i \neq 1}(x_0 - x_i)}{\prod_{i \neq 1}(x_1 - x_i)} + \cdots + F(p(x_t), r) \cdot \frac{\prod_{i \neq t}(x_0 - x_i)}{\prod_{i \neq t}(x_t - x_i)} = \delta(x_0).$$

Now, Theorem 2 will be proven to show that the t-out-of-n scheme satisfies the three conditions noted above. In relation to computational correctness, let T be a subset of [n] of size t. Without loss of generality, one may assume T=[t]. One may prove that:

$$\text{Rec}(\{\text{Eval}(f_i, a, r)\}_{i \in T}) = \alpha.$$

Note that for all $1 \leq i \leq t$ and $1 \leq h \leq 2\ell + \lambda$:

$$S_{0,h}(i) = s_{i,0}[h] = \sum_{j=0}^{\ell-1} \left( v_{i,2j+a_j}[h] + \sum_{l=1}^{n} F_1(k_{l,2j+a_j,i}, r)[h] \right) =$$

$$\sum_{j=0}^{\ell-1} r_{2j+a_j,h}(i) + \sum_{j=0}^{\ell-1} \sum_{l=1}^{n} F_1(P_{l,2j+a_j}(i), r)[h] =$$

$$\sum_{j=0}^{\ell-1} r_{2j+a_j,h}(i) + F_1\left(\sum_{j=0}^{\ell-1} \sum_{l=1}^{n} p_{l,2j+a_j}(i), r\right)[h].$$

Let $p(X) = \sum_{j=0}^{\ell-1} \sum_{l=1}^{n} p_{l,2j+a_j}(X)$, a polynomial of degree $\leq t-1$. By Lemma 1, there exists a polynomial $\delta(X) \in \mathbb{L}[X]$ of degree $\leq t-1$, such that $\delta(i) = F_1(p(i), r)[h]$ for all $0 \leq i \leq t$. Because $S_{0,h}(X)$ agrees with $\sum_{j=0}^{\ell-1} r_{2j+a_j,h}(X) + \delta(X)$ at the t points $X=1, 2, \ldots, t$, and both of them are polynomials of degree $\leq t-1$, they must be identical. That is:

$$S_{0,h}(X) = \sum_{j=0}^{\ell-1} r_{2j+a_j,h}(X) + \delta(X).$$

Therefore:

$$S_{0,h}(0) = \sum_{j=0}^{\ell-1} r_{2j+a_j,h}(0) + \delta(0) = \sum_{j=0}^{\ell-1} v_{2j+a_j}[h] + F_1(p(0), r)[h] =$$

$$\sum_{j=0}^{\ell-1} v_{2j+a_j}[h] + F_1\left(\sum_{j=0}^{\ell-1} \sum_{l=1}^{n} p_{l,2j+a_j}(0), r\right)[h] =$$

$$\theta[h] + F_1\left(\sum_{j=0}^{\ell-1} \sum_{l=1}^{n} k_{l,2j+a_j}, r\right)[h] = \theta[h] + F_1(k, r)[h],$$

That is, $(S_{0,1}(0), \ldots, S_{0,2\ell+\lambda}(0)) = \theta + F_1(k, r)$. The output of Rec is thus $S_1(0) - F_2(k, r)$, which, by a similar argument as above, is equal to $$\left(\sum_{j=0}^{\ell-1} \alpha_{2j+a_j} + F_2(k, r)\right) - F_2(k, r) = \sum_{j=0}^{\ell-1} \alpha_{2j+a_j} = \alpha.$$

Next, it may be shown that evaluation at $x \neq a$ is correct except with probability negligible in $\lambda$. Let $u_j = v_j + F_1(k_j, r)$ for $j=0, \ldots, 2\ell - 1$, where $k_j = \sum_{l=1}^{n} k_{l,j}$. Again, by a similar argument as above, $$\sum_{j=0}^{\ell-1} u_{2j+a_j} = \sum_{j=0}^{\ell-1} (v_{2j+a_j} + F_1(\sum_{l=1}^{n} k_{l,2j+a_j}, r)) = \theta + F_1(k, r),$$

and evaluation at $x \neq a$ gives:

$$(S_{0,1}(0), \ldots, S_{0,2\ell+\lambda}(0)) =$$

$$\sum_{j=0}^{\ell-1} \left( v_{2j+x_j} + F_1\left(\sum_{l=1}^{n} k_{l,2j+x_j}, r\right) \right) = \sum_{j=0}^{\ell-1} u_{2j+x_j}.$$

The result now follows by following the proof for computational correctness noted above in relation to the proof for computational correctness in Theorem 1 above.

Proving the t-out-of-n scheme of Theorem 2 demonstrates perfect secrecy: Gen($a, \alpha, \lambda$) outputs $(f_1, f_2, \ldots, f_n)$, where $$f_i = (i, v_{i,0}, \ldots, v_{i,2\ell-1}, \theta, \alpha_{i,0}, \ldots, \alpha_{i,2\ell-1}, k_{i,0}, \ldots, k_{i,2\ell-1}, k^{(i)}, k)$$

and $$k^{(i)} = \{(i', j', k_{i',j',i}) : 1 \leq i' \leq n, 0 \leq j' \leq 2\ell - 1\}.$$

Suppose one is given $f_i$ from $t-1$ parties, which can be assumed, without loss of generality, to be the first $t-1$ parties. Any $t-1$ Shamir shares of a t-out-of-n threshold scheme are independently and uniformly distributed. Thus, $v_{i,j}$ ($1 \leq i \leq t-1$, $0 \leq j \leq 2\ell - 1$) and $\theta$ are independently and uniformly distributed. The same holds for $\alpha_{i,j}$ ($1 \leq i \leq t-1$, $0 \leq j \leq 2\ell - 1$). $k_{i,j}$ ($1 \leq i \leq t-1$, $0 \leq j \leq 2\ell - 1$) and $k$ are $2\ell(t-1)+1$ linearly independent elements picked uniformly at random from $\mathcal{K}$, while $k_{i',j',i}$ ($1 \leq i' \leq n$, $0 \leq j' \leq 2\ell - 1$, $1 \leq i \leq t-1$) are independently and uniformly distributed. Thus, the distribution of $(f_1, \ldots, f_{t-1})$ does not depend on $a$ or $\alpha$.

Regarding computational multi-evaluation, let $S \subset [n]$ such that $|S| < t$. Assume $x_1, x_2, \ldots, x_m \neq a$, and $r_1, r_2, \ldots, r_m \in R$ are distinct. In turn, one may get:

$$\text{Eval}(f_i, x_h, r_h) = \left(i, \sum_{j=0}^{\ell-1} \left(v_{i,2j+x_{h,j}} + \sum_{l=1}^{n} F_1(k_{l,2j+x_{h,j}}, r_h)\right)\right),$$

$$\sum_{j=0}^{\ell-1} \left(\alpha_{i,2j+x_{h,j}} + \sum_{l=1}^{n} F_2(k_{l,2j+x_{h,j}}, r_h)\right), r_h, \theta, k\right) =$$

$$\left(i, \sum_{j=0}^{\ell-1} v_{i,2j+x_{h,j}} + F_1\left(\sum_{j=0}^{\ell-1} \sum_{l=1}^{n} k_{l,2j+x_{h,j}}, r_h\right),\right.$$

$$\left.\sum_{j=0}^{\ell-1} \alpha_{i,2j+x_{h,j}} + F_2\left(\sum_{j=0}^{\ell-1} \sum_{l=1}^{n} k_{l,2j+x_{h,j}}, r_h\right) r_h, \theta, k\right).$$

Let $S \subseteq U \subseteq S[n]$. One may prove by induction on $|U|$ that the distribution of $(\{f_i\}_{i \in S}, \{\text{Eval}(f_i, x_h, r_h)\}_{i \in U, h \in [m]})$ is computationally indistinguishable regardless of the choice of $a$ and $\alpha$.

The base case simply follows from perfect secrecy; because the distribution of $\{f_i\}_{i \in S}$ is independent of the choice of $a$ and $\alpha$, so is the distribution of $(\{f_i\}_{i \in S}, \{\text{Eval}(f_i, x_h, r_h)\}_{i \in S, h \in [m]})$.

Suppose for some $S \subseteq U' \subset [n]$, that $(\{f_i\}_{i \in S}, \{\text{Eval}(f_i, x_h, r_h)\}_{i \in U, h \in [m]})$ is computationally indistinguishable regardless of the choice of $a$ and $\alpha$. Let $u \notin U'$, and let $U^* = U' \cup \{u\}$. Three cases may be considered.

Case 1: $|U'|<t-1$, i.e., $|U^*|<t$. As above, it follows from perfect secrecy that the distribution of $(\{f_i\}_{i \in S}, \{\text{Eval}(f_i, x_h, r_h)\}_{i \in U^*, h \in [m]})$ is independent of a and $\alpha$.

Case 2: $|U'|=t-1$, i.e., $|U^*|=t$ Assume one is given:

$$(\{f_i\}_{i \in U'}, \{\text{Eval}(f_i, x_h, r_h)\}_{i \in U', h \in [m]}),$$

whose distribution is independent of a and $\alpha$ by perfect secrecy.

One may fix some $h \in [m]$. Note that $\sum_{j=0}^{\ell-1} \sum_{l=1}^{n} k_{l,2j+x_{h,j},i}$ ($i \in U^*$) are Shamir shares of $\sum_{j=0}^{\ell-1} \sum_{l=1}^{n} k_{l,2j+x_{h,j}}$, which is randomly and uniformly distributed as an element of $\mathcal{K}$ outside the span of $\{k_{i,j}: i \in U', 0 \le j \le 2\ell -1\} \cup \{k\}$. It follows that the advantage of an adversary in distinguishing $F(\sum_{j=0}^{\ell-1} \sum_{l=1}^{n} k_{l,2j+x_{h,j}}, r)$ from random is negligible in $\lambda$, thus the same holds for $F(\sum_{j=0}^{\ell-1} \sum_{l=1}^{n} k_{l,2j+x_{h,j},u}, r)$ (which, by Lemma 1, is an $\mathbb{F}$-linear combination of $F(\sum_{j=0}^{\ell-1} \sum_{l=1}^{n} k_{l,2j+x_{h,j}}, r)$ and $F(\sum_{j=0}^{\ell-1} \sum_{l=1}^{n} k_{l,2j+x_{h,j},i}, r)$ for $i \in U'$).

Thus, even with knowledge of $(\{f_i\}_{i \in U'}, \{\text{Eval}(f_i, x_h, r_h)\}_{i \in U', h \in [m]})$, both the distribution of $\sum_{j=0}^{\ell-1} v_{u,2j+x_{h,j}} + F_1(\sum_{j=0}^{\ell-1} \sum_{l=1}^{n} k_{l,2j+x_{h,j},u}, r_h)$ and the distribution of $\sum_{j=0}^{\ell-1} \alpha_{u,2j+x_{h,j}} + F_2(\sum_{j=0}^{\ell-1} \sum_{l=1}^{n} k_{l,2j+x_{h,j},u}, r_h)$ are indistinguishable from uniformly random, except with probability negligible in $\lambda$.

Case 3: $|U'| \ge t-1$, i.e., $|U^*|>t$. Assume one is given:

$$(\{f_i\}_{i \in U'}, \{\text{Eval}(f_i, x_h, r_h)\}_{i \in U', h \in [m]}),$$

whose distribution is computationally independent of a and $\alpha$ by the induction hypothesis. Because $\sum_{j=0}^{\ell-1} v_{i,2j+x_{h,j}} + F_1(\sum_{j=0}^{\ell-1} \sum_{l=1}^{n} k_{l,2j+x_{h,j},i}, r_h)$ are Shamir shares of $\sum_{j=0}^{\ell-1} v_{i,2j+x_{h,j}} + F_1(\sum_{j=0}^{\ell-1} \sum_{l=1}^{n} k_{l,2j+x_{h,j}}, r_h)$, by Lemma 1, for any $u_1, \ldots, u_t \in U'$, there exists $c_1, \ldots, c_t \in \mathbb{F}$ such that:

$$\sum_{j=0}^{\ell-1} v_{u,2j+x_{h,j}} + F_1\left(\sum_{j=0}^{\ell-1} \sum_{l=1}^{n} k_{l,2j+x_{h,j}u}, r_h\right) =$$
$$c_1 \cdot \left(\sum_{j=0}^{\ell-1} v_{u_1,2j+x_{h,j}} + F_1\left(\sum_{j=0}^{\ell-1} \sum_{l=1}^{n} k_{l,2j+x_{h,j}u_1}, r_h\right)\right) +$$
$$\cdots + c_t \cdot \left(\sum_{j=0}^{\ell-1} v_{u_t,2j+x_{h,j}} + F_1\left(\sum_{j=0}^{\ell-1} \sum_{l=1}^{n} k_{l,2j+x_{h,j}u_t}, r_h\right)\right).$$

A similar argument shows that $\sum_{j=0}^{\ell-1} \alpha_{u,2j+x_{h,j}} + F_2(\sum_{j=0}^{\ell-1} \sum_{l=1}^{n} k_{l,2j+x_{h,j}}, r_h)$ (i.e., Eval($f_u$, $x_h$, $r_h$)) is determined by $(\{f_i\}_{i \in S}, \{\text{Eval}(f_i, x_h, r_h)\}_{i \in U', h \in [m]})$.

Figure 5:
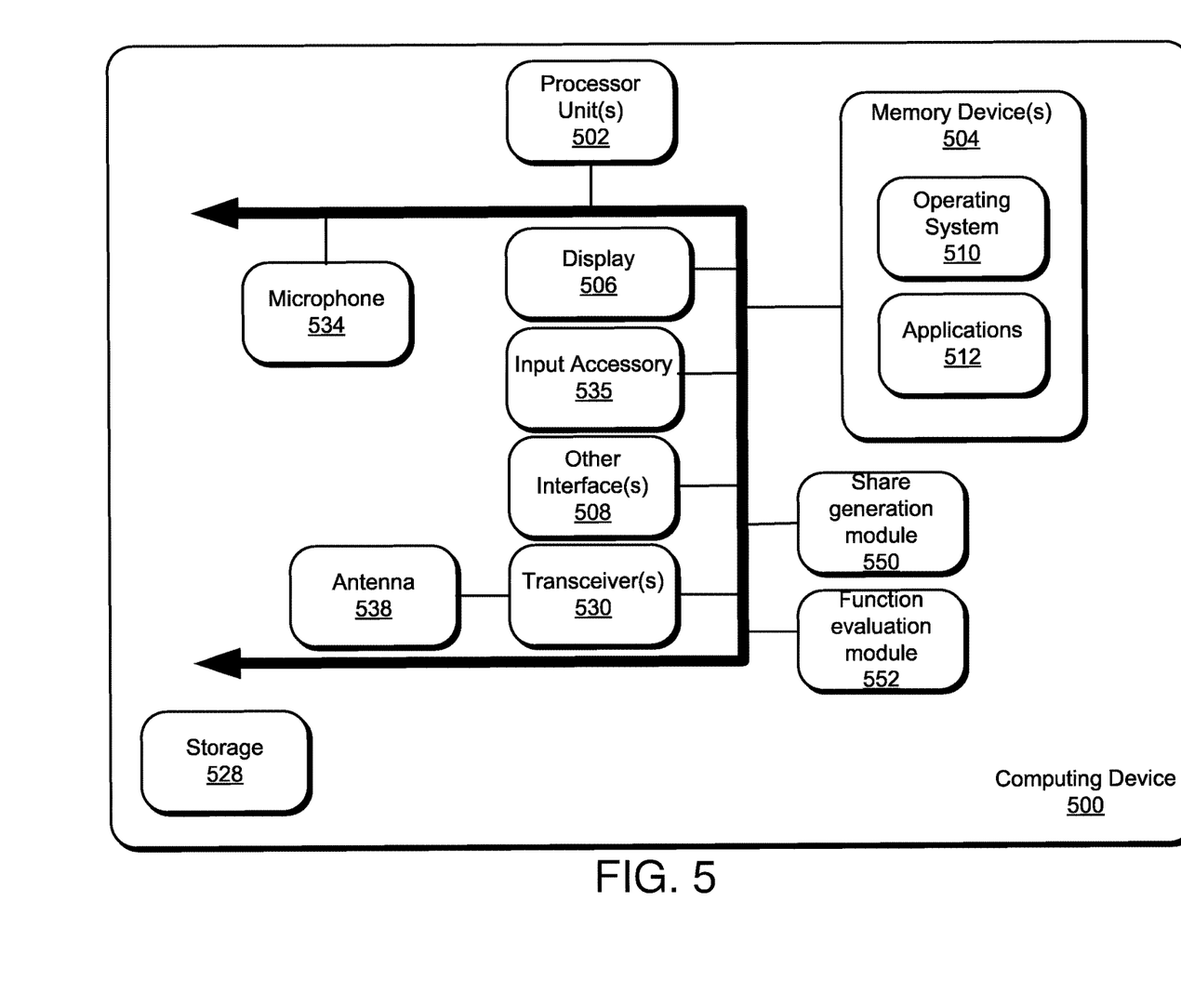
FIG. 5 illustrates a schematic of an example computing device for executing functionality described herein.

FIG. 5 illustrates an example schematic of a computing device 500 suitable for implementing aspects of the disclosed technology including a share generation module 550 and/or a function evaluation module 552 as described above. The computing device 500 includes one or more processor unit(s) 502, memory 504, a display 506, and other interfaces 508 (e.g., buttons). The memory 504 generally includes both volatile memory (e.g., RAM) and non-volatile memory (e.g., flash memory). An operating system 510, such as the Microsoft Windows® operating system, the Apple macOS operating system, or the Linux operating system, resides in the memory 504 and is executed by the processor unit(s) 502, although it should be understood that other operating systems may be employed.

One or more applications 512 are loaded in the memory 504 and executed on the operating system 510 by the processor unit(s) 502. Applications 512 may receive input from various input local devices such as a microphone 534, input accessory 535 (e.g., keypad, mouse, stylus, touchpad, joystick, instrument mounted input, or the like). Additionally, the applications 512 may receive input from one or more remote devices such as remotely-located smart devices by communicating with such devices over a wired or wireless network using more communication transceivers 530 and an antenna 538 to provide network connectivity (e.g., a mobile phone network, Wi-Fi®, Bluetooth®). The computing device 500 may also include various other components, such as a positioning system (e.g., a global positioning satellite transceiver), one or more accelerometers, one or more cameras, an audio interface (e.g., the microphone 534, an audio amplifier and speaker and/or audio jack), and storage devices 528. Other configurations may also be employed.

The computing device 500 further includes a power supply 516, which is powered by one or more batteries or other power sources, and which provides power to other components of the computing device 500. The power supply 516 may also be connected to an external power source (not shown) that overrides or recharges the built-in batteries or other power sources.

In an example implementation, the computing device 500 comprises hardware and/or software embodied by instructions stored in the memory 504 and/or the storage devices 528 and processed by the processor unit(s) 502. The memory 504 may be the memory of a host device or of an accessory that couples to the host. Additionally or alternatively, the computing device 500 may comprise one or more field programmable gate arrays (FPGAs), application specific integrated circuits (ASIC), or other hardware/software/firmware capable of providing the functionality described herein.

The computing device 500 may include a variety of tangible processor-readable storage media and intangible processor-readable communication signals. Tangible processor-readable storage can be embodied by any available media that can be accessed by the computing device 500 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 500. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

One general aspect of the present disclosure includes a method for generating shares in a function secret sharing (FSS) scheme to facilitate multiple evaluation of a secret function. The method includes choosing a key-homomorphic pseudo random function (PRF) F. The method also includes generating at least one key k for the key-homomorphic PRF for each of a plurality of parties in the FSS scheme. The method includes generating a function share for each of the plurality of parties at least in part based on the at least one key k for each respective one of the plurality of parties and distributing the function shares to corresponding ones of the plurality of parties. An output share of each of a plurality of participating parties is combinable to generate an output of the secret function. The output share is generated based on the function share and the at least one key k. In turn, the secret function is evaluatable multiple times without providing any information regarding the secret function.

Implementations may include one or more of the following features. For example, the output share of each of the plurality of participating parties may include the function share evaluated at a function input common to all of the plurality of participating parties. The output share may also include a masking component generated based on the key-homomorphic PRF evaluated using the at least one key k of the participating party and a common random value common to all of the plurality of participating parties.

In an example, the secret function comprises a point function. The at least one key may include a plurality of linearly independent keys. The masking component may be at least in part based on the function input.

In an example, the participating parties may include all of the plurality of parties, and all of the plurality of parties are required to provide an output share for evaluation of the secret-shared function. In another example, the plurality of participating parties may include a threshold number of the plurality of parties, and the threshold number of participating parties is required to provide an output share for evaluation of the secret-shared function.

In an example, the FSS scheme provides computational correctness and perfect secrecy. Also, a size of the key share and the function share may be polynomial in the size of the function domain.

Another general aspect of the present disclosure includes a method for evaluating a secret function using a function secret sharing (FSS) scheme. The method includes receiving, from each of a plurality of participating parties, an output share based on a function share of a participating party and at least one key of each of the plurality of participating parties. The method includes combining the output shares from each of the plurality of participating parties. The method also includes evaluating the secret function at an input based on the output shares in relation to a result of an evaluation of the key-homomorphic PRF using a key. The secret function can be evaluated multiple times without providing any information regarding the secret function.

Implementations may include one or more of the following features. For example, the output share may include the function share evaluated at a function input common to all of the plurality of participating parties. The output share may also include a masking component generated based on the key-homomorphic PRF evaluated using the at least one key of the participating party and a common random value common to all of the plurality of participating parties.

In an example, the secret function may be a point function. Also, the at least one key may include a plurality of linearly independent keys. The masking component may be at least in part based on the function input.

In an example, the plurality of participating parties may include all of a plurality of parties having received a key share and a function share, such that all of the plurality of parties are required to provide an output share for evaluation of the secret function. In another example, the plurality of participating parties may include a threshold number of a plurality of parties having received a key share and a function share, such that the threshold number of participating parties is required to provide an output share for evaluation of the secret-share function.

In an example, the FSS scheme may provide computational correctness and perfect secrecy. In another example, a size of the key share and the function share may be polynomial in the size of the function domain.

Another general aspect of the present disclosure includes one or more tangible processor-readable storage media embodied with instructions for executing on one or more processors and circuits of a device a process for a function secret sharing (FSS) scheme to facilitate multiple evaluation of a secret function. The process includes choosing a key-homomorphic pseudo random function (PRF). The process also includes generating at least one key for the key-homomorphic PRF for each of a plurality of parties in the FSS scheme. The process further includes generating a function share of the secret function for each of the plurality of parties at least in part based on the at least one key for each respective one of the plurality of parties and distributing the function share to each respective one of the plurality of parties. An output share of each of a plurality of participating parties is combinable to generate an output of the secret function. The output share is generated based on the function share and the at least one key, and the secret function is evaluatable multiple times without providing any information regarding the secret function.

Implementations may include one or more of the following features. For example, the process may also include receiving from each of the plurality of participating parties the output share based on the function share of a participating party. The process may also include combining the output shares from each of the plurality of participating parties and evaluating the secret function at an input based on the output shares in relation to a result of an evaluation of the key-homomorphic PRF using a key.

In an example, the output share may include the function share evaluated at a function input common to all of the plurality of participating parties. The output share may also include a masking component generated based on the key-homomorphic PRF evaluated using the at least one key of the participating party and a common random value common to all of the plurality of participating parties.

In an example, the secret function may be a point function. Furthermore, the at least one key may include a plurality of linearly independent keys. The masking component may be at least in part based on the function input.

In an example, the plurality of participating parties may include all of the plurality of parties having received a key share and a function share, such that all of the plurality of parties are required to provide an output share for evaluation of the secret function. In another example, the plurality of participating parties may include a threshold number of the plurality of parties having received a key share and a function share, and the threshold number of participating parties may be required to provide an output share for evaluation of the secret-share function.

While the invention has been illustrated and described in detail in the drawings and foregoing description, such illustration and description are to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for generating shares in a function secret sharing (FSS) scheme to facilitate multiple evaluation of a secret function, comprising:
choosing a key-homomorphic pseudo random function (PRF) F;
generating at least one key k for the key-homomorphic PRF for each of a plurality of parties in the FSS scheme;
generating a function share for each of the plurality of parties at least in part based on the at least one key k for each respective one of the plurality of parties;
distributing the function shares to corresponding ones of the plurality of parties; and
wherein an output share of each of a plurality of participating parties is combinable to generate an output of the secret function, wherein the output share is generated based on the function share and the at least one key k, and wherein the secret function is evaluatable multiple times without providing any information regarding the secret function.

2. The method of claim 1, wherein the output share of each of the plurality of participating parties includes the function share evaluated at a function input common to all of the plurality of participating parties and a masking component generated based on the key-homomorphic PRF evaluated using the at least one key k of the participating party and a common random value common to all of the plurality of participating parties.

3. The method of claim 2, wherein the secret function comprises a point function, the at least one key comprises a plurality of linearly independent keys, and the masking component is at least in part based on the function input.

4. The method of claim 1, wherein the participating parties comprise all of the plurality of parties, and all of the plurality of parties are required to provide an output share for evaluation of the secret-shared function.

5. The method of claim 1, wherein the plurality of participating parties comprises a threshold number of the plurality of parties, and the threshold number of participating parties is required to provide an output share for evaluation of the secret-shared function.

6. The method of claim 1, wherein the FSS scheme provides computational correctness and perfect secrecy.

7. The method of claim 1, wherein a size of the key share and the function share is polynomial in the size of the function domain.

8. A method for evaluating a secret function using a function secret sharing (FSS) scheme, comprising:
receiving, from each of a plurality of participating parties, an output share based on a function share of a participating party and at least one key of each of the plurality of participating parties;
combining the output shares from each of the plurality of participating parties;
evaluating the secret function at an input based on the output shares in relation to a result of an evaluation of the key-homomorphic PRF using a key, wherein the secret function can be evaluated multiple times without providing any information regarding the secret function.

9. The method of claim 8, wherein the output share comprises the function share evaluated at a function input common to all of the plurality of participating parties and a masking component generated based on the key-homomorphic PRF evaluated using the at least one key of the participating party and a common random value common to all of the plurality of participating parties.

10. The method of claim 8, wherein the secret function comprises a point function, the at least one key comprises a plurality of linearly independent keys, and the masking component is at least in part based on the function input.

11. The method of claim 8, wherein the plurality of participating parties comprise all of a plurality of parties having received a key share and a function share, wherein all of the plurality of parties are required to provide an output share for evaluation of the secret function.

12. The method of claim 8, wherein the plurality of participating parties comprises a threshold number of a plurality of parties having received a key share and a function share, and the threshold number of participating parties is required to provide an output share for evaluation of the secret-share function.

13. The method of claim 8, wherein the FSS scheme provides computational correctness and perfect secrecy.

14. The method of claim 8, wherein a size of the key share and the function share is polynomial in the size of the function domain.

15. One or more tangible processor-readable storage media embodied with instructions for executing on one or more processors and circuits of a device a process for a function secret sharing (FSS) scheme to facilitate multiple evaluation of a secret function, the process comprising:
choosing a key-homomorphic pseudo random function (PRF);
generating at least one key for the key-homomorphic PRF for each of a plurality of parties in the FSS scheme;
generating a function share of the secret function for each of the plurality of parties at least in part based on the at least one key for each respective one of the plurality of parties;
distributing the function share to each respective one of the plurality of parties; and
wherein an output share of each of a plurality of participating parties is combinable to generate an output of the secret function, wherein the output share is generated based on the function share and the at least one key, and wherein the secret function is evaluatable multiple times without providing any information regarding the secret function.

16. The one or more tangible processor-readable storage media of claim 15, wherein the process further comprises:
receiving from each of the plurality of participating parties the output share based on the function share of a participating party;
combining the output shares from each of the plurality of participating parties; and
evaluating the secret function at an input based on the output shares in relation to a result of an evaluation of the key-homomorphic PRF using a key.

17. The one or more tangible processor-readable storage media of claim 15, wherein the output share comprises the function share evaluated at a function input common to all of the plurality of participating parties and a masking component generated based on the key-homomorphic PRF evaluated using the at least one key of the participating party and a common random value common to all of the plurality of participating parties.

18. The one or more tangible processor-readable storage media of claim 15, wherein the secret function comprises a point function, the at least one key comprises a plurality of linearly independent keys, and the masking component is at least in part based on the function input.

19. The one or more tangible processor-readable storage media of claim 15, wherein the plurality of participating parties comprise all of the plurality of parties having received a key share and a function share, wherein all of the plurality of parties are required to provide an output share for evaluation of the secret function.

20. The one or more tangible processor-readable storage media of claim 15, wherein the plurality of participating parties comprises a threshold number of the plurality of parties having received a key share and a function share, and the threshold number of participating parties is required to provide an output share for evaluation of the secret-share function.

* * * * *